United States Patent Office 2,777,749
Patented Jan. 15, 1957

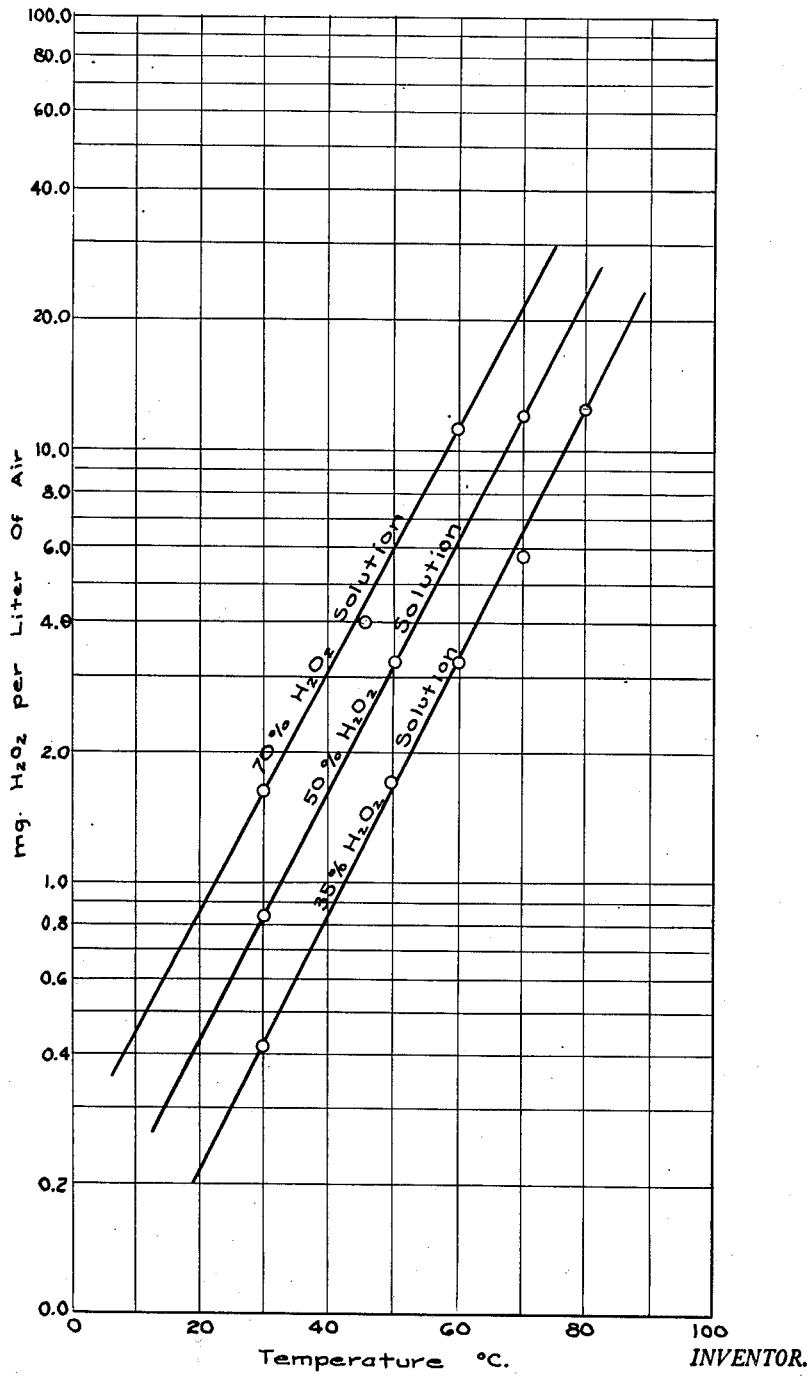

2,777,749

PROCESS FOR APPLICATION OF HYDROGEN PEROXIDE TO MATERIALS

James H. Young, Niagara Falls, N. Y., assignor to E. I. du Pont de Nemours and Company, Wilmington, Del., a corporation of Delaware Application May 29, 1953, Serial No. 358,503

12 Claims. (Cl. 8—104)

This invention relates to the treatment of materials with hydrogen peroxide and particularly to an improved method for applying hydrogen peroxide to solid materials to be treated therewith.

Hydrogen peroxide is extensively employed in treating various solid materials. Thus, it is used to bleach fibrous materials of various kinds, particularly those of vegetable, animal and synthetic organic origin in the form of textiles, wood pulps, wood and the like; to condition starch and flour; and to bleach or sterilize foodstuffs. It is customary in such treatments to apply the hydrogen peroxide or equivalent peroxygen compound as a dilute solution, e. g. one containing the equivalent of 0.02 to 1.0 $H_2O_2$. Such low concentrations effect the desired reaction, e. g. bleaching, at a relatively slow rate. Higher concentrations would be more effective but their use by prior methods is not generally practical.

It has been proposed to overcome the disadvantage of low concentration by applying relatively concentrated peroxide solutions to dry or relatively dry materials, such as cloth or wood pulp, so as to obtain a greater $H_2O_2$ concentration in the liquor contacting the material than is practical in bath treating methods. However, rapid and uniform distribution of the peroxide throughout the material, which is essential to the obtainment of uniform results, is difficult to obtain by surface spraying or similar application methods. Moreover, such a method is shown in McEwen U. S. P. 2,465,738 to give maximum bleaching of groundwood at a pulp consistency of about 35–40% (moisture contents of 185–150% based on the dry pulp) while at higher consistencies bleaching falls off rapidly with the indication that the method is impractical at such higher consistencies.

It is an object of the invention to provide an improved method for treating materials with hydrogen peroxide. Another object is to provide an improved method for applying hydrogen peroxide to solid materials to be treated therewith. A further object is a method for applying hydrogen peroxide whereby the treating solution containing a relatively high $H_2O_2$ concentration is formed in situ upon the solid material being treated in a uniformly distributed condition. Still further objects will be apparent from the following description.

The above objects are accomplished in accordance with the invention by contacting the solid material to be treated in a moist condition with $H_2O_2$ vapor until the material contains the desired amount of absorbed $H_2O_2$. Such contact can be made under conditions such that absorption of the $H_2O_2$ and its reaction with the material occur simultaneously; or the conditions can be such that absorption occurs with little or no reaction, in which event the material with its absorbed $H_2O_2$ may be subsequently subjected to conditions facilitating the desired reaction. In most cases, the amount of $H_2O_2$ absorbed will be at least 0.01% based on the dry weight of the material. Generally, the rate of reaction of the absorbed $H_2O_2$ with the material will be less rapid than the rate of absorption so that the concentration of absorbed $H_2O_2$ will increase as the time of absorption is extended.

The material contacted with the $H_2O_2$ vapor should be moist, by which is meant it should contain free water (as distinguished from chemically bound water or water of constitution) uniformly distributed throughout or on the surfaces of the solid material in an amount at least equal to 5% but not exceeding 75% of the dry weight of the material. By "dry weight" is meant the weight of the material after being dried to a constant weight at 110° C.

It has been found that material containing less than about 5% water does not effectively react with the absorbed $H_2O_2$. On the other hand, if more than about 75% water is present, the absorbed $H_2O_2$ becomes so diluted by the water that no particular advantage results over prior methods of applying hydrogen peroxide. Highly beneficial results are obtained when the free water content of the material being treated is within the range indicated. Under such conditions, $H_2O_2$ is rapidly absorbed from the vapor phase in a uniformly distributed condition to form in situ on the material a solution containing a relatively high $H_2O_2$ concentration which provides an effective driving force for the reaction and accelerates its rate. The peroxide solution formed acts with great efficiency and frequently permits the obtainment of the desired result using substantially less peroxide per unit weight of material being treated than is possible in bath treating methods and in a much shorter time.

Absorption of $H_2O_2$ vapor by moist solid materials occurs surprisingly rapidly even from gas mixtures containing $H_2O_2$ vapor in extremely low concentrations, e. g. as low as 0.1 mg. $H_2O_2$ per liter. The rate of absorption increases as the $H_2O_2$ concentration in the gas mixture is increased. It generally will be desirable to employ gas mixtures containing at least 0.5 mg. $H_2O_2$ per liter; preferably, the concentration will range from 1.0 to 100 mg. per liter. Much higher concentrations are effective, however, and can be practically produced and used.

$H_2O_2$ vapor for use in practicing the invention can be produced by vaporizing hydrogen peroxide solutions, e. g. by known flash distillation methods from heated inert solid surfaces, or by spraying such solutions in finely divided form into a stream of a hot inert gas. Another convenient method involves intimately contacting a stream of an inert gas with a hydrogen peroxide solution. The gas, which should be inert towards hydrogen peroxide vapor, simply can be bubbled through the solution. Preferably, the gas will be in finely divided form such as would be provided by vigorously agitating the solution while the gas is passed therethrough or by introducing the gas into the bottom of the solution by means of a sparger or distributor. Another convenient way is to pass streams of the gas and the solution either concurrently or countercurrently to each other through a packed column.

When producing the $H_2O_2$ vapor by intimately contacting a solution of the peroxide with an inert gas such as air, nitrogen, oxygen or steam, the concentration of $H_2O_2$ in the resulting gas mixture will depend upon the rate of flow of the gas, the temperature of the solution and the concentration of $H_2O_2$ in the solution. If the rate of gas flow is slow enough to permit establishment of substantially equilibrium conditions, the $H_2O_2$ vapor content of the resulting gas mixture will be proportional to the temperature and $H_2O_2$ content of the solution. Concentrations of $H_2O_2$ vapor obtainable in air streams flowing at rates permitting substantially equilibrium conditions when employing aqueous solutions containing 35, 50 and 70%

$H_2O_2$ at various temperatures are indicated in the curves of the drawing. Each curve shows the $H_2O_2$ content as milligrams of $H_2O_2$ per liter of air passed through the solution at the rate of 1.35 liters/min., as a function of the temperature of the solution. Such $H_2O_2$ contents are shown on the logarithmic scale of the graph. The curves were obtained by plotting the following experimental data.

| Solution Temp., ° C. | Mg. $H_2O_2$/l. of Air Passed Through Solutions at Concentrations of— | | |
|---|---|---|---|
| | 35% | 50% | 70% |
| 30 | 0.42 | 0.82 | 1.6 |
| 45 | | | 4.0 |
| 50 | 1.70 | 3.17 | |
| 60 | 3.20 | | 11.2 |
| 70 | 5.70 | 12.0 | |
| 80 | 12.5 | | |

Hydrogen peroxide solutions used as the source of $H_2O_2$ vapor usually should contain at least about 20% $H_2O_2$ when the vapor is generated by contacting the solution with an inert gas. Commercially available aqueous solutions containing 27.5 to 90% $H_2O_2$ are generally suitable. By feeding in water and hydrogen peroxide in the proportions removed the $H_2O_2$ content of the solution can be kept constant.

Absorption of $H_2O_2$ vapor by the moist material can be effected by contacting the material with $H_2O_2$ vapor in any desired way. Preferably, such contact will be effected in a continuous manner under continuously controlled conditions so as to obtain uniform results. A continuous sheet or web of the moist material can be passed at a constant rate through an absorption zone through which is also passed a gas stream containing $H_2O_2$ vapor. The web and gas stream can be passed through the zone either concurrently or countercurrently to each other. By keeping constant the rates of passage of the web and gas stream, the moisture content of the web, the $H_2O_2$ vapor content of the gas stream and the temperature in the zone, the amount of $H_2O_2$ absorbed can also be kept constant. The amount absorbed can be varied as desired by suitably varying the operating conditions, e. g. it can be increased by increasing the time of contact or the $H_2O_2$ vapor content of the gas stream, or it can be decreased by making opposite changes.

Reaction of the absorbed $H_2O_2$ with the moist material can occur in the absorption zone under suitably controlled conditions. Thus, by effecting absorption at a temperature which also facilitates reaction of the absorbed $H_2O_2$ with the material, absorption and reaction will occur simultaneously. Absorption of the $H_2O_2$ may be effected over a wide range of temperatures, e. g. from 1° C. to the boiling point of water. Temperatures ranging from about 20° C. to about 90° C. are generally most practical. In bleaching operations, the bleaching reaction will usually occur sufficiently rapidly at temperatures above about 50° C. for it to be said that absorption and bleaching occur simultaneously at such temperatures. However, even at such higher temperatures, $H_2O_2$ consumption generally will not be as rapid as its absorption so that a substantial amount of absorbed $H_2O_2$, e. g., at least 0.10% based on the dry weight of the material, will usually be present in the material after a suitable contact time.

Operations in accordance with the invention will usually be carried out at substantially atmospheric pressure although higher pressures can be used and may be advantageous at times. Pressures below atmospheric pressure may be used, provided water and $H_2O_2$ do not vaporize rapidly at the prevailing temperature.

If absorption of the $H_2O_2$ is effected under conditions such that the $H_2O_2$ does not react or reacts but slowly with the moist material, it may be desirable in some cases to subject the material with its absorbed $H_2O_2$ to conditions, e. g. higher temperature, which accelerate the reaction. On the other hand, the reaction can simply be carried out by storing the material with its absorbed $H_2O_2$ at a temperature at which reaction occurs slowly.

The invention is illustrated by the following examples. In the examples and elsewhere in the specification all percentages stated are percentages by weight. All brightness values were determined using a Hunter reflectometer which measures percent reflectance. The points increase in brightness reported represent increases in reflectance. Thus, an increase in brightness from 56 to 67.5% is reported as a brightness increase of 11.5 points.

*Example 1*

A block of wood having a mahogany veneer surface and dried to contain 5–10% moisture was treated in a chamber at 30° C. with an agitated gas mixture containing about 2 mg. $H_2O_2$ vapor per liter. After 10 minutes exposure the block was next treated by holding it in a closed chamber over a 28% aqueous ammonia solution at 30° C. for 8 minutes. After repeating both treatments, the veneer showed a brightness increase of 11 points. The surface of the treated wood was smooth and dry and sanding to give a smooth surface was unnecessary. When such wood surfaces are given a conventional liquid bleach, the wood must be dried and sanded, because it is roughened by the bleaching liquid.

*Example 2*

Desized and boiled out unbleached cotton muslin was pretreated by immersion in a solution containing 10 g. of sodium silicate (10% $Na_2O$, 25% $SiO_2$ and 65% $H_2O$) per liter. The excess solution was removed to leave a moisture content of about 73%. The cotton was then treated for 2 minutes with a stream of air containing about 1.5 mg. $H_2O_2$ vapor per liter. The cotton absorbed about 0.7% $H_2O_2$ based on its dry weight. It was then stored in closed chamber at 100° C. for 1 hr. A brightness increase of 12 points was obtained.

Cotton goods which have been dyed with a reduced vat dye by conventional methods such as a pad-steam method, washed to recove excess dye, caustic and reducing agent, and partly dried, can be rapidly and completely oxidized with $H_2O_2$ vapor in a similar manner.

*Example 3*

Samples of piece goods made from acrylonitrile polymer fibers were pretreated for 30 minutes in 90% formic acid (90% HCOOH, 10% $H_2O$) at 80° C., drained and blotted. The wet material contained about 0.9 part HCOOH and 0.1 part $H_2O$ per part of dry fabric. The samples were then passed into a vapor treating zone provided with agitation to which vapor from a 70% aqueous $H_2O_2$ solution held at 30° C. was transferred by an air stream flowing at 3 liters per minute. The air contained about 1.6 mg. $H_2O_2$ per liter. After 5–10 minutes, the goods had absorbed $H_2O_2$ equal to 1–2% of their dry weight. After storage in a closed chamber at 65° C. for 45 minutes, brightness increases of 7 to 10 points resulted.

*Example 4*

Nylon taffeta piece goods were pretreated by scouring with a 1% NaOH solution, washing, and soaking in a 25% aqueous solution of formic acid. Excess solution was removed to give a moisture content of about 10%. The goods were then treated for 5 minutes at 30° C. with an air stream flowing at 3 liters per minute and containing 1.6 mg. $H_2O_2$ per liter. The $H_2O_2$ absorbed was about 1% of the dry weight of the goods. The goods with absorbed $H_2O_2$ were stored 45–60 minutes at 65° C. in a closed container. Brightness increases of about 5 points were obtained.

Example 5

A continuous strip of paper (15% sulfite pulp–85% groundwood pulp) 6 inches wide and having a brightness of 56% was pretreated so as to contain about 0.5% sodium pyrophosphate ($Na_4P_2O_7 \cdot 10H_2O$), 0.25% borax ($Na_4B_2O_7 \cdot 10H_2O$) and 52% $H_2O$, based on the dry weight of the paper. It was then passed at 8 ft. per minute through a vapor treating zone where it contacted a gas mixture containing 14.2 mg. $H_2O_2$ per liter flowing at 6 liters per minute. The gas mixture was obtained by bubbling air through an aqueous 54% $H_2O_2$ solution at 70–72° C. The $H_2O_2$ absorbed was 0.35% of the dry weight of the paper. The strip was then passed at a rate corresponding to a residence time of 14 seconds through a heated chamber held at about 96 to 98° C. Paper emerging from the chamber showed a brightness increase of 3.7 points, still contained 0.25% $H_2O_2$ and its moisture content was 28%. It was rolled up and allowed to stand for 18 hours at 25° C. There was an additional brightness increase of 5 points and the $H_2O_2$ content was then 0.15%. Finally, the paper was brought to a pH of 5.5 by treatment with $SO_2$ to give an additional brightness increase of 2.8 points. The total brightness increase from 0.35% $H_2O_2$ was 11.5 points.

Example 6

The general procedure of Example 5 was followed except that the gas mixture employed in the vapor treating zone contained 18 mg. $H_2O_2$ per liter, the paper from the heated chamber was stored in a roll for 90 hours at about 25° C., and the pH was then reduced to 6. The $H_2O_2$ contents of the paper from the vapor treating zone and from the heated chamber, respectively, were 0.55% and 0.35%. The incremental brightness increases after (1) passage through the heated chamber, (2) storage at room temperature and (3) reduction of the pH with $SO_2$ were, respectively, 5.8, 6.5 and 1.7 points. The total brightness increase from the 0.55% absorbed $H_2O_2$ was 14 points.

Example 7

Sulfite pulp handsheets were pretreated so as to contain about 0.5% sodium pyrophosphate and 9% water based on the dry pulp weight. The sheets were exposed for 1 or 3 minutes to an air mixture containing about 3 mg. $H_2O_2$ per liter, then stored in closed vessels at 100° C. for various times. Results are shown below:

| Exposed Time, Min. | Percent $H_2O_2$ Absorbed | Storage Time, Min. | Brightness Increase, Points |
|---|---|---|---|
| 3 | 1 | 3 | 9 |
| 3 | 1 | 10 | 13 |
| 3 | 1 | 30 | 15 |
| 1 | 0.4 | 3 | 7 |
| 1 | 0.4 | 10 | 8 |
| 1 | 0.4 | 30 | 9 |

Example 8

Handsheets of kraft pulp, semi-bleached by conventional treatments with chlorine, caustic soda and hypochlorite, were pretreated with a solution containing 0.05% magnesium sulfate ($MgSO_4 \cdot 7H_2O$), 3% 42° Bé. sodium silicate ($Na_2O=10\%$, $SiO_2=25\%$, $H_2O=65\%$) and excess moisture was removed by squeezing and drying in air. The handsheets, containing about 7–10% $H_2O$ based on the weight of the dry pulp, were treated at 85° C. with an air-vapor mixture containing about 17 mg. $H_2O_2$ per liter. The $H_2O_2$ absorbed was about 0.34% of the dry weight of the sheets. Immediately after the exposure, the brightness increase was 4.0 points. After reducing the pH to 5–6 with $SO_2$ gas, an additional brightness increase of 0.4 point resulted.

Example 9

The results of this example show the effect of moisture content of wood pulp upon bleaching effectiveness, i. e. brightness increase. In one series of tests, pulp samples containing 85% groundwood and 15% sulfite pulp were treated so as to contain, based on the dry weight of the pulp, 0.5% sodium pyrophosphate, 0.25% borax, 0.5% $H_2O_2$, the amount of water shown in the table below, and sufficient sodium hydroxide to give a pH for the mixture of 9.5. Except for the moisture content, all of the treated samples were the same, and each was placed immediately into a closed bottle which was then placed for 5 minutes in an oven maintained at 100° C. At the end of the 5 minute period, each sample was removed and its brightness determined. A similar series of tests was carried out employing 1.0% $H_2O_2$. The results obtained are tabulated below. The brightness of the original pulp was 56%.

| Percent Moisture | Brightness Increase (Points) Using— | |
|---|---|---|
| | 0.5% $H_2O_2$ | 1.0% $H_2O_2$ |
| 104 | 6.2 | 9.5 |
| 79 | 6.9 | |
| 72 | | 11.5 |
| 61 | 8.7 | |
| 49 | | 13.6 |
| 45 | 9.2 | |
| 33 | 9.7 | 13.8 |
| 23 | 10.2 | 13.5 |
| 15 | | 12.8 |
| 12 | 8.5 | |
| 9 | | 10.1 |
| 4 | 2.5 | 5.0 |

The above results show that bleaching effectiveness decreases substantially as the moisture content falls below about 5% or increases above about 75%. The preferred moisture contents are in the range of about 15–60%.

Example 10

44 g. wheat flour was mixed by agitation with 2% by weight of anhydrous, finely powdered sodium pyrophosphate ($Na_4P_2O_7$). This flour, which contained about 10% moisture, was then treated under agitation for 1 hour with a stream of air containing about 0.9 mg. $H_2O_2$ per liter. 0.55% $H_2O_2$ based on the weight of flour was absorbed. After standing overnight at room temperature, the flour was bleached. Dough ball tests also showed that the bread-making properties of the treated flour were improved.

Example 11

Connecticut Broadleaf tobacco was heated at 70° C. for 1 hour to destroy catalase. About 25–30% moisture to prevent brittleness was added. It was then treated for 30 minutes in a chamber with a stream of $H_2O_2$ vapor in air (0.8 mg. $H_2O_2$ per liter) flowing at 3 liters per minute. The $H_2O_2$ absorbed was about 1.1% of the dry weight of the tobacco. After 24 hours in a closed container at room temperature, the $H_2O_2$ content had dropped to 0.69% and the tobacco was bleached to a substantially lighter color.

Example 12

An 80 g. sample of unmodified corn starch containing about 7% moisture was treated in a chamber equipped with an agitator with a stream of $H_2O_2$ vapor (0.8 mg. per liter) in air flowing at 3 liters per minute. The treatment was conducted at 50° C. for 40 minutes and 0.7% $H_2O_2$ was absorbed based on the dry weight of the starch. The sample was then stored in a closed bottle at 45° C. for 2 hours. This treatment substantially reduced the viscosity of the starch.

Contact times between the $H_2O_2$ vapor and the moist material sufficient for 0.1 to 3% $H_2O_2$, based on the dry weight of the material, to be absorbed are usually suitable for most purposes, particularly for bleaching treatments. In some instances, longer or shorter contact times corresponding to lesser or greater amounts of absorbed $H_2O_2$ may be desirable depending upon the material being treated and the purpose of the treatment.

In employing $H_2O_2$ vapor in accordance with the invention, it may be desirable, or even necessary, in some cases to precondition the material being treated. Thus, it is generally known that in many bleaching treatments hydrogen peroxide is more effective under alkaline than under acidic conditions and that the presence of stabilizers is usually desirable. Accordingly, pretreatment with an alkaline material, a stabilizer, or combinations of such or other materials will frequently be desirable. Aftertreatments, e. g. with a neutralizing agent, or with a reducing agent for the purpose of destroying residual peroxide or for supplementing the action of the peroxide, may also be desirable. Such preconditioning or aftertreatments may be effected in any suitable manner, e. g. by solution impregnation or spraying methods, or with a suitable gas.

I claim:

1. In a method for treating and reacting a solid material with hydrogen peroxide, the improvement comprising applying hydrogen peroxide to said material by contacting said material, while said material has a free water content of 5% to 75% based on the dry weight of the material, with hydrogen peroxide and continuing said contact until 0.01 to 3.0% of hydrogen peroxide based on the dry weight of the material has been absorbed, and reacting the absorbed hydrogen peroxide with said solid material in the absence of any further amount of hydrogen peroxide.

2. In a method for treating and reacting a solid material with hydrogen peroxide, the improvement comprising applying hydrogen peroxide to said material by contacting said material, while said material has a free water content of 5 to 75% based on the dry weight of the material, with hydrogen peroxide vapor in admixture with an inert gas and continuing said contact until 0.01 to 3.0% of hydrogen peroxide based on the dry weight of the material has been absorbed, and reacting the absorbed hydrogen peroxide with said solid material in the absence of any further amount of hydrogen peroxide.

3. In a method for treating and reacting a solid material with hydrogen peroxide, the improvement comprising contacting said material, while said material has a free water content of 5 to 75% based on the dry weight of the material, with $H_2O_2$ vapor until said material has an absorbed $H_2O_2$ content of 0.01 to 3.0% based on the dry weight of the material, and reacting the absorbed hydrogen peroxide with said solid material in the absence of any further amount of hydrogen peroxide.

4. The method of claim 1 wherein the absorption of $H_2O_2$ by the moist material is effected at a temperature below that at which reaction between the moist material and the absorbed $H_2O_2$ occurs rapidly, and the moist material with its absorbed $H_2O_2$ is subsequently heated to effect said reaction.

5. The method of claim 1 wherein the resulting moist material with its absorbed $H_2O_2$ is subsequently subjected to conditions under which reaction between the material and the absorbed $H_2O_2$ occurs slowly.

6. The method of claim 3 wherein an aqueous $H_2O_2$ solution is intimately contacted with a stream of an inert gas to provide a gas mixture containing the $H_2O_2$ vapor employed.

7. The method of claim 3 wherein the absorbed $H_2O_2$ equals 0.1 to 3% of the dry weight of the material.

8. A method for treating and reacting a textile material with hydrogen peroxide comprising contacting a textile material having a free water content of not less than about 5% nor more than 75%, based on the dry weight of said material, with a gaseous mixture of $H_2O_2$ vapor and an inert gas and maintaining said contact until said material has absorbed an amount of $H_2O_2$ equal to 0.1 to 3% of the dry weight of said material, and reacting the absorbed $H_2O_2$ with said material in the absence of any further amount of hydrogen peroxide.

9. The method of claim 8 wherein the gaseous mixture is obtained by intimately contacting an aqueous $H_2O_2$ solution with a stream of said inert gas.

10. A method for bleaching wood pulp comprising contacting wood pulp having a free water content of not less than about 5% nor more than 75%, based on the dry weight of said pulp, with a gaseous mixture of $H_2O_2$ vapor and an inert gas, and maintaining said contact until said pulp has absorbed an amount of $H_2O_2$ equal to 0.1 to 3% of the dry weight of the pulp, and bleaching said pulp with the absorbed $H_2O_2$ in the absence of any further amount of hydrogen peroxide.

11. The method of claim 10 wherein the gaseous mixture is obtained by intimately contacting an aqueous $H_2O_2$ solution with a stream of said inert gas.

12. The method of claim 10 wherein the moisture content of the pulp is in the range 15 to 60%.

References Cited in the file of this patent

UNITED STATES PATENTS

| | | |
|---|---|---|
| 1,759,341 | Baum | May 20, 1930 |
| 2,037,119 | Comey | Apr. 14, 1936 |
| 2,131,160 | Avedikian | Sept. 27, 1938 |
| 2,492,047 | K'Burg | Dec. 20, 1949 |

FOREIGN PATENTS

| | | |
|---|---|---|
| 633,852 | Germany | Aug. 7, 1936 |